(12) United States Patent
Vieux

(10) Patent No.: US 10,454,687 B2
(45) Date of Patent: Oct. 22, 2019

(54) NON-REPUDIATION OF ELECTRONIC TRANSACTIONS

(71) Applicant: Assa Abloy AB, Stockholm (SE)

(72) Inventor: Georges Robert Vieux, Fremont, CA (US)

(73) Assignee: ASSA ABLOY AB, Stockholm (SE)

( * ) Notice: Subject to any disclaimer, the term of this patent is extended or adjusted under 35 U.S.C. 154(b) by 174 days.

(21) Appl. No.: 14/776,130

(22) PCT Filed: Mar. 13, 2014

(86) PCT No.: PCT/IB2014/001581
§ 371 (c)(1),
(2) Date: Sep. 14, 2015

(87) PCT Pub. No.: WO2014/181189
PCT Pub. Date: Nov. 13, 2014

(65) Prior Publication Data
US 2016/0036592 A1    Feb. 4, 2016

Related U.S. Application Data

(60) Provisional application No. 61/794,187, filed on Mar. 15, 2013.

(51) Int. Cl.
*H04L 29/00* (2006.01)
*H04L 9/32* (2006.01)
*H04L 29/06* (2006.01)

(52) U.S. Cl.
CPC .......... *H04L 9/3247* (2013.01); *H04L 9/3271* (2013.01); *H04L 63/061* (2013.01); *H04L 63/123* (2013.01)

(58) Field of Classification Search
CPC ... H04L 9/3247; H04L 63/061; H04L 9/3271; H04L 63/123; H04L 2012/5682;
(Continued)

(56) References Cited

U.S. PATENT DOCUMENTS 6,108,783 A    8/2000    Krawczyk et al.
6,578,144 B1   6/2003    Gennaro et al.
(Continued)

FOREIGN PATENT DOCUMENTS

EP    2974129 A2    1/2016
WO    WO-2014181189 A2    11/2014

OTHER PUBLICATIONS

Jinyuan Sun, et al., "An ID-Based Framework Achieving Privacy and Non-Repudiation in Vehicular Ad Hoc Networks," 2007, MILCOM 2007, IEEE, Oct. 29, 2007,XP031232472, pp. 1-7, ISBN: 978-1-4244-1512-0.
"European Application Serial No. 14771614.6, Communication Pursuant to Article 94(3) EPC dated Jun. 23, 2016", 5 pgs.
"European Application Serial No. 14771614.6, Communication Pursuant to Article 94(3) EPC dated Aug. 17, 2018", 6 pgs.
(Continued)

*Primary Examiner* — Brandon S Hoffman
*Assistant Examiner* — Helai Salehi
(74) *Attorney, Agent, or Firm* — Schwegman Lundberg & Woessner, P.A.

(57) ABSTRACT

Providing an electronic message includes constructing a first digital signature of the message and a personal secret known only to a sender of the message, constructing a second digital signature of the first digital signature and the message, and sending to a receiver the message, the first digital signature, and the second digital signature. The personal secret may be initially generated by the sender. The personal secret may be a pseudo-random number. The receiver may archive the message, the first signature, and the second signature. In response to a challenge, the message and the first and second signatures sent with the message may be compared using first and second signatures reconstructed by the sender. In response to at least one of the message and the first signature not matching, the message may be repudiated. Otherwise, the message may be validated. The sender may be a cell phone.

13 Claims, 5 Drawing Sheets

(58) Field of Classification Search
CPC ... H04L 9/3249; H04L 9/3252; H04L 9/3255; H04L 9/3257; G06F 21/16; G06F 21/64; G06F 2221/0733; H04N 2005/91335; H04N 21/8358; G11B 20/00289; G11B 20/00884

See application file for complete search history.

(56) References Cited

U.S. PATENT DOCUMENTS

| | | | |
|---|---|---|---|
| 6,898,707 B1* | 5/2005 | Sit | G06F 21/602 |
| | | | 713/167 |
| 2004/0068650 A1* | 4/2004 | Resnitzky | H04L 63/0428 |
| | | | 713/155 |
| 2005/0060544 A1* | 3/2005 | Huang | G06F 21/10 |
| | | | 713/165 |
| 2006/0179319 A1* | 8/2006 | Krawczyk | G06Q 20/3678 |
| | | | 713/180 |
| 2008/0109657 A1 | 5/2008 | Bajaj et al. | |

OTHER PUBLICATIONS

"European Application Serial No. 14771614.6, Communication Pursuant to Article 94(3) EPC dated Nov. 24, 2017", 6 pgs.

"European Application Serial No. 14771614.6, Response filed Jan. 3, 2017 to Communication Pursuant to Article 94(3) EPC dated Jun. 23, 2016", 10 pgs.

"European Application Serial No. 14771614.6, Response filed Feb. 26, 2019 to Communication Pursuant to Article 94(3) EPC dated Aug. 17, 2018", 11 pgs.

"European Application Serial No. 14771614.6, Response filed May 23, 2018 to Communication Pursuant to Article 94(3) EPC dated Nov. 24, 2017", 8 pgs.

"International Application Serial No. PCT/IB2014/001581, International Preliminary Report on Patentability dated Sep. 24, 2015", 6 pgs.

"International Application Serial No. PCT/IB2014/001581, International Search Report dated Nov. 4, 2014", 4 pgs.

"International Application Serial No. PCT/IB2014/001581, Written Opinion dated Nov. 4, 2014", 4 pgs.

* cited by examiner

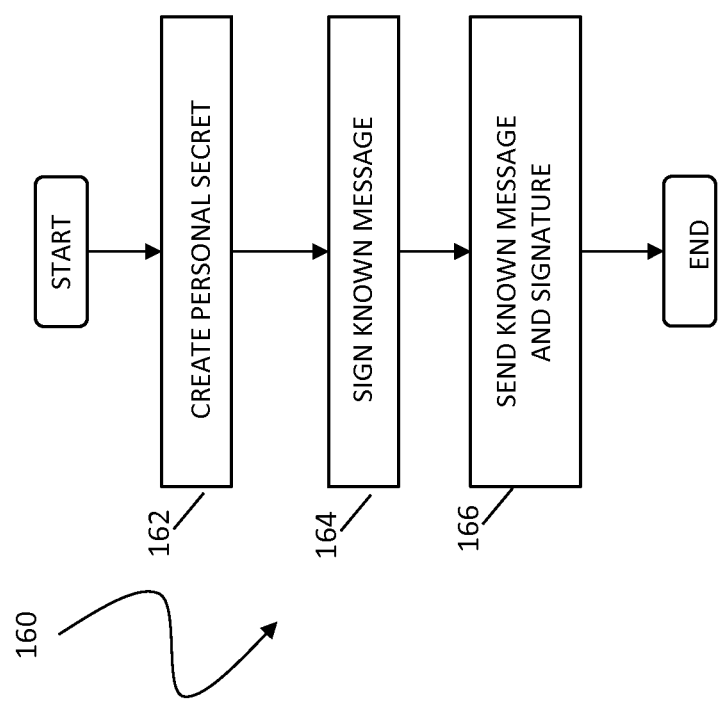

NON-REPUDIATION OF ELECTRONIC TRANSACTIONS

TECHNICAL FIELD

This application relates to the field of electronic transactions and, more particularly, to the field of reliable non-repudiation of electronic transactions.

BACKGROUND OF THE INVENTION

A significant number of transactions occur electronically and remotely where the participants exchange electronic data to facilitate the transaction but nonetheless never meet. In some cases, it is desirable to be able to bind a participant to an electronic transaction in a way that in non-repudiatable by the participant. For example, if a customer instructs a stockbroker to purchase a particular stock that subsequently goes down, it is important for the broker that the customer not be able to repudiate the transaction and try to claim that he never is the broker to purchase the stock.

In the case of asymmetric encryption, non-repudiation is provided by digitally signing data using a secret key known only to one of the participants (and perhaps an issuer of the key, who is trusted not to misuse the key). In such an arrangement, it is possible to verify that particular data (i.e., instructions for a particular transaction) were signed by a specific entity that was in possession of the secret key. This verification is possible without knowing the secret key. Thus, assuming that the secret key has not been compromised, the entity that uses the secret key for digitally signing instructions for a transaction cannot later repudiate the transaction.

However, it is a different situation in the case of symmetric encryption, where multiple participants in an electronic transaction use the same secret key. In such a case, a sender of an encrypted electronic message (i.e., transaction instructions) could repudiate the message by claiming that the message was fraudulently constructed by the receiver. In addition, in some systems, the sender bears the burden of proving that a transaction is fraudulent. However, in the case of symmetric encryption using a shared secret key, the sender cannot meet this burden since a legitimate message signed by the sender using the shared secret key is identical to a fraudulent message constructed by the receiver using the same shared secret key.

Accordingly, it is desirable to provide a mechanism that allows a sender to repudiate an electronic message when the sender and the recipient use the same shared secret key.

SUMMARY OF THE INVENTION

According to the system described herein, providing an electronic message includes constructing a first digital signature of the message and a personal secret known only to a sender of the message, constructing a second digital signature of the first digital signature and the message, and sending to a receiver the message, the first digital signature, and the second digital signature. The personal secret may be initially generated by the sender. The personal secret may be a pseudo-random number. The receiver may archive the message, the first signature, and the second signature. In response to a challenge, the message and the first and second signatures sent with the message may be compared using first and second signatures reconstructed by the sender. In response to at least one of the message and the first signature not matching, the message may be repudiated. Repudiating the message may include confirming that the sender did not change the personal secret by examining a signature of a known message. The known message may be generated in connection with an enrollment of the sender. In response to the message and the first signature matching, the message may be validated. The sender may be a cell phone.

According further to the system described herein, computer software, provided in a non-transitory computer-readable medium, provides an electronic message. The software includes executable code that constructs a first digital signature of the message and a personal secret known only to a sender of the message, executable code that constructs a second digital signature of the first digital signature and the message, and executable code that sends to a receiver the message, the first digital signature, and the second digital signature. The personal secret may be initially generated by the sender. The personal secret may be a pseudo-random number. The receiver may archive the message, the first signature, and the second signature. In response to a challenge, the message and the first and second signatures sent with the message may be compared using first and second signatures reconstructed by the sender. In response to at least one of the message and the first signature not matching, the message may be repudiated. Repudiating the message may include confirming that the sender did not change the personal secret by examining a signature of a known message. The known message may be generated in connection with an enrollment of the sender. In response to the message and the first signature matching, the message may be validated. The sender may be a cell phone.

BRIEF DESCRIPTION OF THE DRAWINGS

Embodiments of the system described herein are explained with reference to the several figures of the drawings, which are briefly described as follows.

FIG. 6 is a flow diagram illustrating steps performed in connection with generating and enrolling a personal secret according to an embodiment of the system described herein.

DETAILED DESCRIPTION OF VARIOUS EMBODIMENTS

Figure 1:
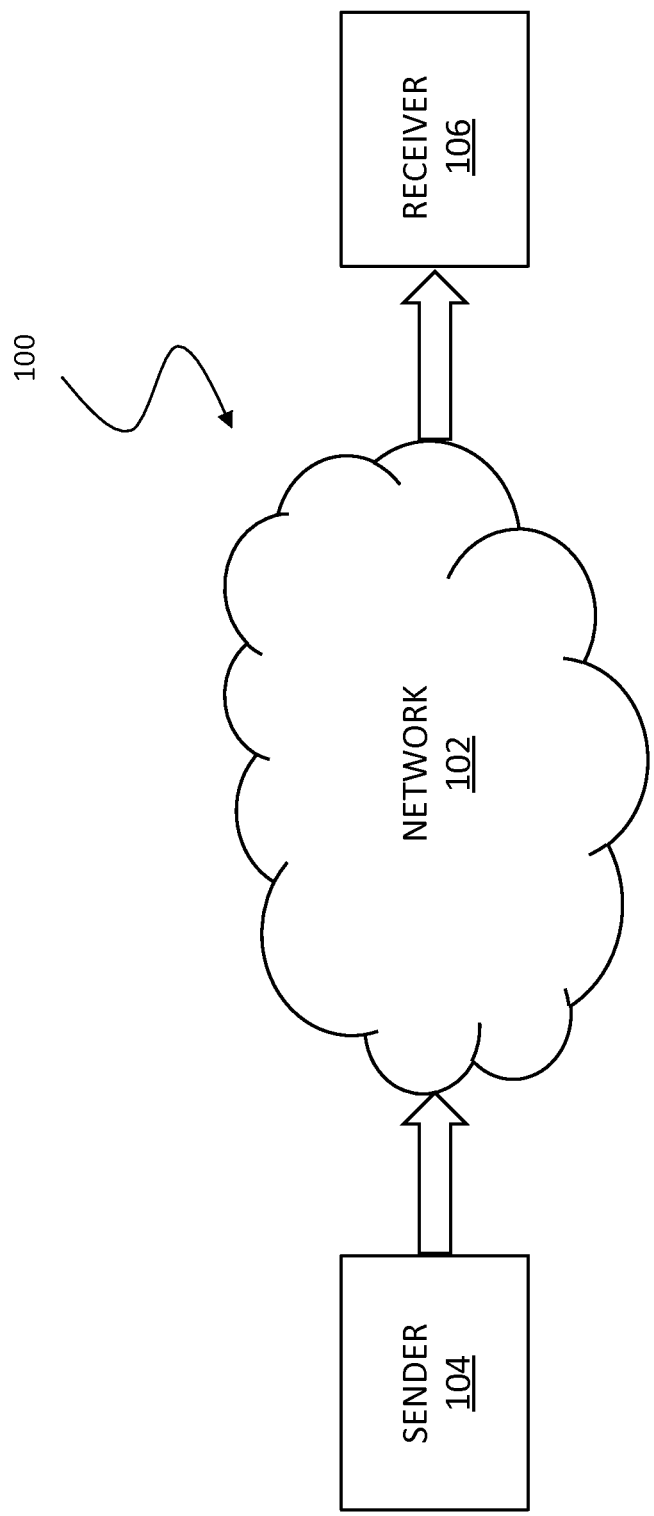
FIG. 1 is a schematic illustration showing a sender and a receiver that communicate over a network according to an embodiment of the system described herein.

Referring to FIG. 1, a system 100 includes a network 102 coupled to a sender 104 and a receiver 106. The sender 104 and the receiver 106 are in communication via the network 102 so that the sender 104 can send information to the receiver 106. The network 102 may be any network capable of facilitating the transmission of data between entities. The network 102 may be a public network, a private network, or a combination of public and private network portions. In an embodiment herein, the network 102 is provided, at least in part, by the World Wide Web.

The sender 104 and the receiver 106 represent any entities capable of sending and receiving data and capable of providing other functionality described elsewhere herein. In an embodiment, the sender 104 is provided by a personal computer used by a bank customer and the receiver 106 is provided by a computer used by a bank for bank transactions. The bank customer uses the sender 104 to send messages to the receiver 106 to initiate and facilitate bank transactions for the customer. In other embodiments, the sender 104 and receiver 106 may be other types of devices, such as tablet(s), smart phone(s), etc. and may send and receive data other than bank transaction related data. The sender 104 may also be implemented using a token, smart card, etc. that provides some of the functionality illustrated herein in connection with a computing device, such as a laptop.

It is desirable for the receiver 106 to be able to verify that a particular message was sent by the sender 104 and by not another entity. In an embodiment herein, the sender 104 and the receiver 106 share a single secret shared key that can be used by the sender 104 to digitally sign and possibly encrypt messages that are sent to the receiver 106 and used by the receiver 106 to verify that received messages were sent by the sender 104 and not another entity. The sender 104 uses the secret shared key and a one-way function, such as a hash function, to compute a digital signature of a sent message. A one-way function is a function where, given the output value(s), it is nearly impossible (i.e., extremely difficult and impractical) to determine the input value(s). Note, by the way, that the sender 104 can also use the secret shared key (or possibly another mechanism) to encrypt the message to prevent third parties from intercepting and reading the message when the message is transmitted over the network 102.

The sender 104 sends the (possibly encrypted) message and the digital signature over the network 102 to the receiver 106. The receiver uses the shared secret key to decrypt the message (if the message was encrypted) and regenerates the digital signature using the one-way function, the message, and the secret shared key. If the regenerated digital signature equals the digital signature received by the receiver 106 (presumable from the sender 104), then the source if the message is verified as the sender 104 (assuming that the shared secret key is not otherwise compromised). If the regenerated digital signature does not equal the digital signature received by the receiver 106, then the sender 104 is not the source of the message.

In an embodiment herein, the sender 104 generates a second secret value, a personal secret, that is known only to the sender 104. The personal secret may be generated randomly, pseudo-randomly, or by using any appropriate technique for generating a value that is known only to the sender 104. Generally, the personal secret can be anything that is known to the sender 104 but not known to the receiver 106 and may be generated by or on behalf of the sender 104. In an embodiment herein, the personal secret is generated at the time of activation (e.g., of a token used by the sender 104) using an embedded algorithm. As explained in more detail elsewhere herein, the personal secret may be used by the sender to repudiate or confirm messages sent from the sender 104 to the receiver 106 via the network 102. Note that, in some cases, the sender 104 may escrow or otherwise cause the personal secret to be saved in a way that protects against the personal secret being lost or eliminated by the sender 104. Thus, for the remainder of the discussion herein, reference to the personal secret being known only to the sender 104 is understood to exclude any incidental knowledge by escrow agents or similar entities.

Figure 2:
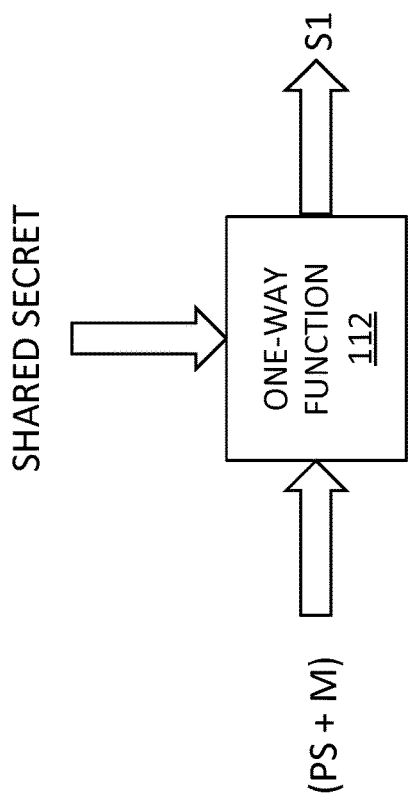
FIG. 2 is a schematic illustration showing a one-way function for signing a message and a personal secret according to an embodiment of the system described herein.

Referring to FIG. 2, a diagram illustrates using a one-way function 112 to generate a first signature, S1. The one-way function 112 uses the shared secret to digitally sign a concatenation of the personal secret (PS) and the message (M), which is illustrated in FIG. 2 as (PS+M). The one-way function 112 is such that, given S1, the message and the shared secret, all of which are known by the receiver 106, it is nearly impossible (i.e., extremely difficult and impractical) to determine the personal secret. In addition, the one-way function 112 is such that, given the message and the shared secret, it is nearly impossible (i.e., extremely difficult and impractical) to generate S1 without also knowing the personal secret.

Figure 3:
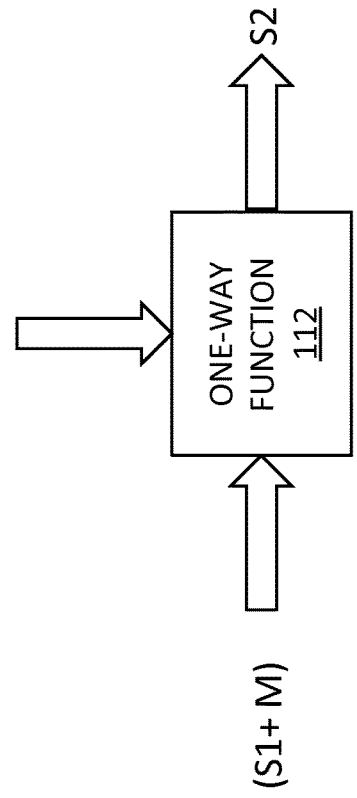
FIG. 3 is a schematic illustration showing a one-way function for signing a message and a first signature according to an embodiment of the system described herein.

Referring to FIG. 3, a diagram illustrates the one-way function 112 being used to generate a second signature, S2, using the shared secret, S1, and the message. S2 is used by the receiver 106 to confirm that S1 and the message were sent by the sender 104 and not some other entity. Assuming that the shared secret is known only to the sender 104 and the receiver 106 (and possibly an issuer, agent(s) of the issuer, escrow agent(s), etc.), then the receiver 106 receiving S2 confirms to the receiver 106 that only the sender 104 could have sent the message and S1. FIG. 3 also illustrates that, optionally, a clock (time) value and a counter may be included with the message and S1 prior to digitally signing. That is, S2 may correspond to a signed concatenation of the message, S1, the clock value, and the counter. The clock and the counter may be added to systems that require one or both for compliance with a relevant standard and/or specification.

Figure 4:
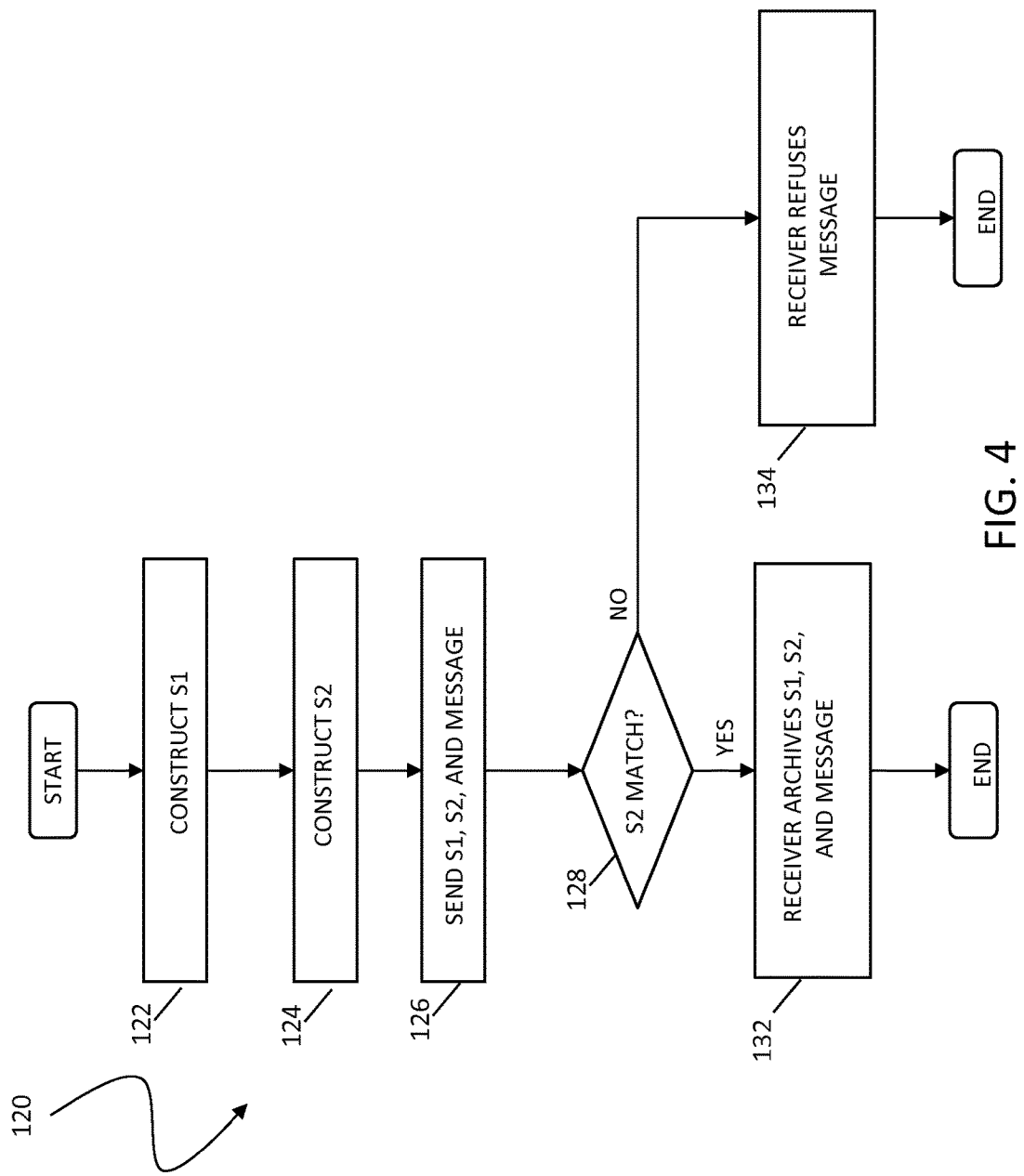
FIG. 4 is a flow diagram illustrating steps performed in connection with sending a message and digital signatures according to an embodiment of the system described herein.

Referring to FIG. 4, a flow diagram 120 illustrates steps performed in connection with sending a message from the sender 104 to the receiver 106. Processing begins at a first step 122 where the sender 104 constructs S1, which is described in more detail elsewhere herein. Following the step 122 is a step 124 where he sender 104 constructs S2, as described in more detail elsewhere herein. Following the step 124 is a step 126 where the sender 104 sends the message (possibly encrypted) along with S1 and S2 to the receiver 106 via the network 102. Following the step 126 is a test step 128 where it is determined if S2 provided by the sender 104 matches S2 independently calculated by the receiver 106. Note that both the sender 104 and the receiver 106 can independently calculate S2 based on the message, S1, and the shared secret. If the sender 104 and the receiver 106 do not calculate the same value for S2, then either the information received by the receiver 106 was not from the sender 104 or the information was altered in transit (i.e., the message was changed). If it is determined at the step 128 that the values of S2 are the same, then control transfers from the step 128 to a step 132 where the receiver 106 archives the message, S1, and S2. Archiving is useful if the sender 104 attempts to repudiate the message, as described in more detail elsewhere herein. Following the step 128, processing is complete. Alternatively, if the values of S2 to not match at the step 128, then control transfers from the step 128 to a step 134 where the receiver 106 refuses the message. Refusing the message at the step 134 can include requesting a retransmission from the sender 104. Following the step 134, processing is complete.

Figure 5:
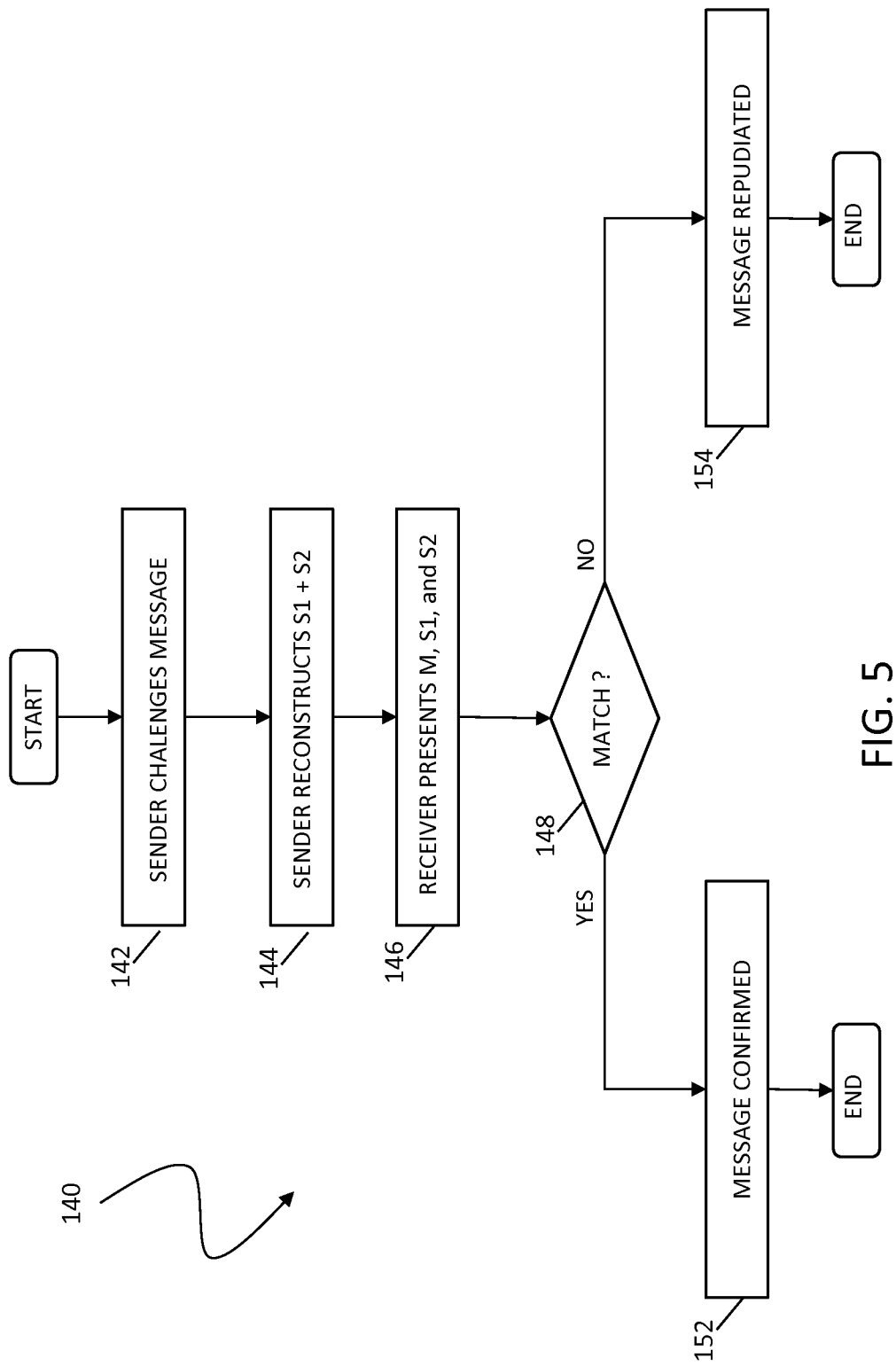
FIG. 5 is a flow diagram illustrating steps performed in connection with repudiating or confirming a message according to an embodiment of the system described herein.

Referring to FIG. 5, a flow diagram 140 illustrates steps performed in connection with the sender 104 attempting to repudiate a message that the receiver 106 attributed to the sender 104. Note that repudiating a message includes the sender 104 denying ever sending a message or, possibly, indicating the message that was sent does not match the message purportedly received. Processing begins at the first step 142 where the sender 104 challenges the authenticity of the message. Following the step 142 is a step 144 where the sender 104 reconstructs S1 and S2 using the one-way function 112 (described above), the shared secret, the message, and the personal secret. Following the step 144 is a step 146 where the receiver 106 presents S1, S2, and the message. Following the step 146 is a test step 148 where the values of the message, S1, and S2 presented by the receiver 106 are compared with the values reconstructed by the sender 104 at the step 144.

If it is determined at the test step 148 that the values match, then processing transfers from the step 148 to a step 152 where the message is confirmed. The values matching, especially the first signature S1, indicates that the message was sent by the sender 104 and so the sender 104 cannot repudiate the message. Following the step 152, processing is complete. On the other hand, if it is determined at the step 148 that the values do not match, then control transfers from the step 148 to a step 154 where the message is repudiated. That is, if the values archived by the receiver 106 do not match the values reconstructed by the sender 104, then it is likely that the sender 104 did not send the message.

In some cases, it may be useful to provide a mechanism to ensure that the sender 104 did not maliciously change the personal secret as a way to fraudulently deny a message that the sender actually sent. That is, it may be useful to be able to detect and prevent a situation where the sender 104 can send a first message using ps1 to generate S1 and then fraudulently deny the message by generating S1' using a different personal secret ps2. This may be prevented by having the sender 104 enroll a personal secret at the time of generation, as explained in more detail herein.

Referring to FIG. 6, a flow diagram 106 illustrates creating and enrolling a personal secret by the sender 104. Processing begins at the first step 162 where the sender initially creates a personal secret, as described in more detail elsewhere herein. Following the step 162 is a step 164 where the sender 104 uses the personal secret to digitally sign a message known to both the sender 104 and the receiver 106. The known message can be anything so long as it is known to both the sender 104 and the receiver 106. Following the step 164 is a step 166 where the message and the digital signature thereof are sent to the receiver 106.

Note that, without more information, the receiver 106 cannot verify the digital signature of the known message since the receiver does not know the personal secret. However, in the event that the sender 104 repudiates a message, the receiver 106 can challenge the repudiation using the known message and the digital signature thereof provided at the step 164. If the receiver 106 suspects that the receiver 104 has changed the personal secret after the values of S1 do not match at the step 148, described above, the receiver 106 may request the personal secret from the sender 104 and confirm whether the personal secret generates S1 when applied to the refuted message and whether the personal secret generates the signature provided at the step 164 when applied to the known message.

In an embodiment of the system described herein, the sender 104 and/or the receiver 106 may be implemented using a mobile device, such as a cell phone. The mobile device may interface with the network 102 using a cellular network and/or using some other technology such as Bluetooth or Wi-fi. The mobile device may use any appropriate Operating System. The receiver 106 may be a door controller.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only.

What is claimed is:

1. A method of providing an electronic message, comprising:
   constructing a first digital signature by digitally signing a combination of the message and a personal secret using a shared secret that is not the personal secret;
   constructing a second digital signature of the first digital signature and the message using the shared secret, wherein the second digital signature confirms a source of the first digital signature and the message; and
   sending to a receiver the message, the first digital signature, and the second digital signature;
   wherein the personal secret is initially generated by or on behalf of a sender of the message and is initially known to the sender but not known to the receiver; and
   wherein in response to a challenge, first and second signatures reconstructed by the sender of the message are provided for comparison with the first and second digital signatures sent with the message, and the message is valid when the first digital signature and the first signature reconstructed by the sender match and the second digital signature and the second signature reconstructed by the sender match.

2. A method, according to claim 1, wherein the personal secret is a pseudo-random number.

3. A method, according to claim 1, wherein the receiver archives the message, the first digital signature, and the second digital signature.

4. A method, according to claim 1, wherein, in response to at least one of the first digital signature not matching the first signature reconstructed by the sender or the second digital signature not matching the second signature reconstructed by the sender, the message is repudiated.

5. The method, according to claim 1, further comprising enrolling the personal secret, enrolling the personal secret comprising receiving a third digital signature of a second message constructed using the personal secret, the second message known to both the sender and the receiver.

6. A method, according to claim 4, wherein repudiating the message includes confirming that a sender of the message did not change the personal secret by examining a signature of a known second message.

7. The method, according to claim 5, further comprising confirming that the sender of the message did not change the personal secret by:

constructing a fourth digital signature by digitally signing the second message using the personal secret; and comparing the third digital signature with the fourth digital signature.

8. A method, according to claim 6, wherein the known second message is generated in connection with an enrollment of the sender.

9. Computer software, provided in a non-transitory computer-readable medium, that provides an electronic message, the software comprising:

executable code that constructs a first digital signature by digitally signing a combination of the message and a personal secret using a shared secret that is not the personal secret;

executable code that constructs a second digital signature of the first digital signature and the message using a shared secret, wherein the second digital signature confirms a source of the first digital signature and the message;

executable code that sends to a receiver the message, the first digital signature, and the second digital signature; and executable code that, in response to a challenge, provides first and second reconstructed signatures for comparison with the first and second digital signatures sent with the message;

wherein the personal secret is initially generated by or on behalf of a sender of the message and is initially known to the sender but not known to the receiver; and wherein the message is valid when the first digital signature and the first reconstructed signature match and the second digital signature and the second reconstructed signature match.

10. Computer software, according to claim 9, wherein the personal secret is a pseudo-random number.

11. Computer software, according to claim 9, comprising executable code that archives the message, the first digital signature, and the second digital signature for the receiver.

12. Computer software, according to claim 9, comprising executable code that enrolls the personal secret by receiving, from a sender of the message, a third digital signature of a second message constructed using the personal secret, the second message known to both the sender and the receiver.

13. Computer software, according to claim 12, comprising executable code that confirms that the sender of the message did not change the personal secret by:

constructing a fourth digital signature by digitally signing the second message using the personal secret; and comparing the third digital signature with the fourth digital signature.

* * * * *